(12) United States Patent
Ames et al.

(10) Patent No.: US 9,361,389 B2
(45) Date of Patent: Jun. 7, 2016

(54) METHOD FOR PROVIDING A STATE-BASED GUIDANCE AND TECHNOLOGY VIEW FOR AN APPLICATION

(75) Inventors: Andrea Lyn Ames, Redwood City, CA (US); Christian Kotitschke, Rostock (DE); Mathias Koehnke, Seehof (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 975 days.

(21) Appl. No.: 11/230,873

(22) Filed: Sep. 19, 2005

(65) Prior Publication Data

US 2007/0067722 A1 Mar. 22, 2007

(51) Int. Cl.
 G06F 3/00 (2006.01)
 G06F 17/30 (2006.01)
 G06F 9/44 (2006.01)

(52) U.S. Cl.
 CPC ........ G06F 17/30873 (2013.01); G06F 9/4446 (2013.01); *G06F 2216/07* (2013.01)

(58) Field of Classification Search
 CPC .............................. G06F 9/4446; G06F 3/0481
 USPC ........................... 715/705, 709, 712, 854, 855
 See application file for complete search history.

(56) References Cited

U.S. PATENT DOCUMENTS

| 5,493,658 | A | * | 2/1996 | Chiang et al. ................. 715/709 |
|---|---|---|---|---|
| 5,535,422 | A | * | 7/1996 | Chiang et al. ................. 715/709 |
| 6,009,429 | A |   | 12/1999 | Greer et al. |
| 6,307,544 | B1 |   | 10/2001 | Harding |
| 6,314,086 | B1 |   | 11/2001 | Katz et al. |
| 6,928,625 | B2 | * | 8/2005 | Makinen ........................ 715/822 |
| 7,024,658 | B1 | * | 4/2006 | Cohen et al. ................... 717/117 |
| 7,343,557 | B2 | * | 3/2008 | Arend et al. ................... 715/709 |
| 7,346,846 | B2 | * | 3/2008 | Rossi et al. .................... 715/705 |
| 7,865,829 | B1 | * | 1/2011 | Goldfield et al. ............. 715/708 |
| 2002/0116531 | A1 |   | 8/2002 | Chu |
| 2003/0065705 | A1 | * | 4/2003 | Santos-Gomez ............. 709/107 |
| 2003/0233585 | A1 |   | 12/2003 | Quick et al. |
| 2005/0119903 | A1 |   | 6/2005 | Lee |
| 2005/0240876 | A1 | * | 10/2005 | Myers et al. ................... 715/763 |

FOREIGN PATENT DOCUMENTS

| EP | 0957437 | A2 | 11/1999 |
|---|---|---|---|
| EP | 0957437 | A3 | 11/1999 |
| WO | 0068769 |  | 11/2000 |
| WO | 0186483 | A2 | 5/2001 |
| WO | 0186483 | A3 | 5/2001 |

\* cited by examiner

*Primary Examiner* — Haoshian Shih
(74) *Attorney, Agent, or Firm* — Sawyer Law Group, P.C.

(57) ABSTRACT

A state-based guidance method provides to a user operation guidance and technology guidance for an application. The method walks the user step-by-step through an existing interface and guides the user to provide the appropriate input in the appropriate places in the existing interface. Individualized guidance is dynamically provided based on a user profile in addition to state and context of the application. The method describes the technologies used to perform actions presented in the user interface of the application and indicates where these technologies are used, providing an overview of which technologies are used in the application and in what capacity those technologies are implemented.

16 Claims, 9 Drawing Sheets

METHOD FOR PROVIDING A STATE-BASED GUIDANCE AND TECHNOLOGY VIEW FOR AN APPLICATION

FIELD OF THE INVENTION

The present invention generally relates to a interactive application demonstration.

BACKGROUND OF THE INVENTION

Business solutions for managing business processes are increasingly more complex, requiring integration of many different applications and components. These business solutions typically have complex user interfaces that require instruction in use for a sales person demonstrating the business solution or a user of the business solution.

One conventional approach to providing a business solution demonstration uses an intranet portal that can be used in one or more specific customer scenarios. This approach comprises a user interface that is nearly identical to the business solution. Although this technology has proven to be useful, it would be desirable to present additional improvements. This conventional approach provides little information to the user or the sales person on how to operate a demonstration scenario. Instructions can be integrated into the user interface screens to direct a user or sales person in operating the demonstration. However, these instructions distract from the goal of the demonstration, which is to provide the user or sales person with an interaction that is nearly identical to the business solution. Furthermore, assistance and information integrated into the user interface makes it difficult for users to "suspend their disbelief" when viewing the demonstration, causing users to dismiss the demonstration as "smoke and mirrors" rather than an operational infrastructure.

Wizards, well-know mechanisms used in software application user interfaces, may be considered as a conventional technology capable of providing a desired assistance for a business solution. However, wizards provide a new interface for a specific task, walking a user through the task in a linear fashion and collecting input from the user to complete the task for the user. In comparison, a guided tour walks a user step-by-step through an existing user interface and guides the user to provide appropriate input in the appropriate places in an existing user interface.

Moreover, conventional approaches to providing demonstrations of a business solution focus primarily on the user interface. No information is provided to the user regarding what applications or components are used in the functions represented by the user interface. Consequently, an information technology manager without a live demonstrator has difficulty in determining how a particular business solution may fit within available applications or components or which applications or components are required to implement the business solution being demonstrated.

What is therefore needed is a system, a computer program product, and an associated method for providing a state-based guidance and technology view for an application. The need for such a solution has heretofore remained unsatisfied.

SUMMARY OF THE INVENTION

The present invention satisfies this need, and presents a system, a computer program product, and an associated method (collectively referred to herein as "the system" or "the present system") for providing a state-based guidance and technology view for an application. The present system provides guidance to a user such as a customer or sales person, in using an application. The present system provides guidance that is state-based (knowing the location, context, and state of the application, etc.) in a way that does not disrupt the flow of the user interface of the present system or the ability of a sales person to demonstrate the present system as a realistic infrastructure.

The present system walks the user step-by-step through an existing interface and guides the user to provide the appropriate input in the appropriate places in the existing interface. Furthermore, the present system describes the underlying technologies used to perform actions presented in the user interface of the application and indicates where these technologies are used. The present system educates a user regarding how to use the associated application and what technologies are used by the application. In contrast, conventional technologies such as wizards attempt to obscure the complexity of a technology to provide the simplest possible interface to the task. Wizards perform replacement tasks for a user rather than educate a user in how to use an application.

The system of the invention comprises an operation guidance system and a technology guidance system. The operation guidance system provides a step-by-step demonstration of an application using the actual user interface. The operation guidance system provides guidance to a user based one or more states such as, for example, information provided by a user profile. The operation guidance system can configure the user interface for a specific user; additional users using the present system for an application can see different views of the user interface.

The operation guidance system further provides guidance based on a context in which the application is currently operating and provides appropriate instructions to the user based on the context. Information provided to the user in the user interface may be dynamically rendered, based on the state of the operation guidance system and the context of the application.

The technology guidance system provides a list of technologies used in the application for which the present system operates. A user selects a technology from the technology list. In response, the present system presents text describing the role of the selected technology in the application. The present system further indicates whether the selected technology is used in any active portlets.

The technology guidance system allows a user an overview of which technologies (data bases, servers, content management, search engines, messaging, business intelligence, etc.) are used in the application and in what capacity those technologies are implemented. The technology guidance system enables a user to understand which technologies are driving a portion of the user interface and operations associated with that portion of the user interface. The technology guidance system further enables a potential customer to determine which technologies the customer has that can be used in the application demonstrated by the present system and which additional technologies may have to be purchased or upgraded. The present system assists a customer in making an informed decision regarding a product and the technologies required for that product.

The present system can be used, for example, by merging companies or company divisions to determine any overlap or discontinuities between the technologies supporting similar applications. The present system can further be used to provide an overall view of the technologies used by a company, a division, etc.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Internet: A collection of interconnected public and private computer networks that are linked together with routers by a set of standards protocols to form a global, distributed network.

Portlet: A small window on a web-based portal page that allows requests and generates dynamic content.

World Wide Web (WWW, also Web): An Internet client—server hypertext distributed information retrieval system.

Figure 1:
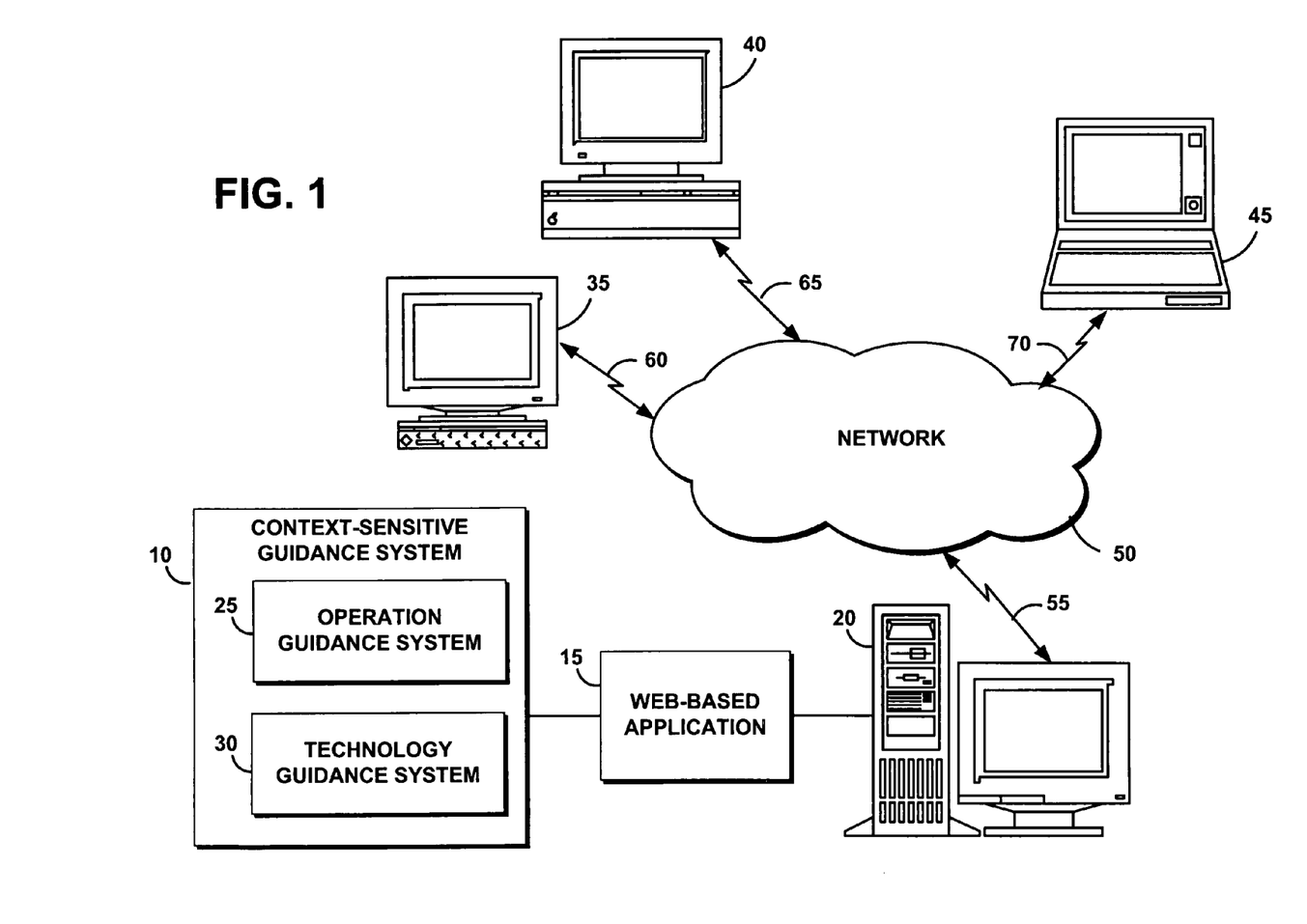
FIG. 1 is a schematic illustration of an exemplary operating environment in which a state-based guidance system of the present invention can be used.

FIG. 1 portrays an exemplary overall environment in which a system, a computer product, and associated method (the state-based guidance system 10 or the "system 10") for providing a state-based guidance and technology view for an application (the web-based application 15) according to the present invention may be used. System 10 comprises a software programming code or a computer program product that is typically embedded within, or installed on a host server 20. Alternatively, system 10 can be saved on a suitable storage medium such as a diskette, a CD, a hard drive, or like devices. System 10 further comprises an operation guidance system 25 and a technology guidance system 30.

Users, such as remote Internet users, are represented by a variety of computers such as computers 35, 40, 45, and can access the host server 20 through a network 50. Computers 35, 40, 45, each comprise software that allows the user to interface securely with the host server 20. The host server 20 is connected to network 50 via a communications link 55 such as a telephone, cable, or satellite link. Computers 35, 40, 45, can be connected to network 50 via communications links 60, 65, 70, respectively. While system 10 is described in terms of network 50, computers 35, 40, 45, may also access system 10 locally rather than remotely. Computers 35, 40, 45, may access system 10 either manually, or automatically through the use of an application.

Figure 2:
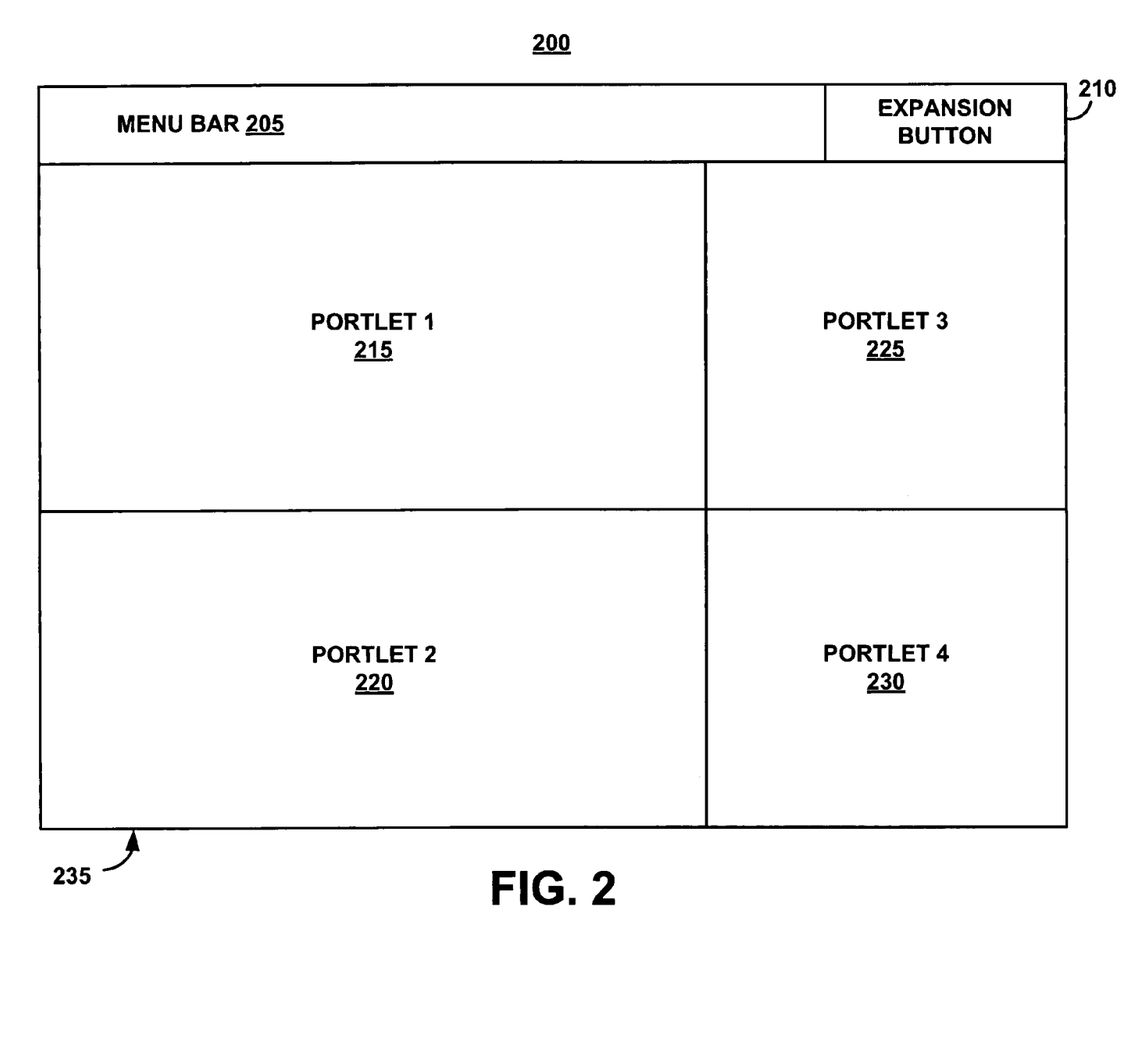
FIG. 2 is a block diagram of an exemplary user interface of an application using the state-based guidance system of FIG. 1.

FIG. 2 illustrates a block diagram of an exemplary user interface 200 for the web-based application 15. The user interface 200 comprises a menu bar 205, an expansion button 210, a portlet 1, 215, a portlet 2, 220, a portlet 3, 225, and a portlet 4, 230, collectively referenced as portlets 235. For illustration purposes only, the user interface 200 is shown comprising four of the portlets 235. In practice, any number of portlets 235 may be used. Each of the portlets 235 provides a user interface for some function of the web-based application 15. Exemplary functions comprise data entry, messaging, search, reporting, etc. While the portlets 235 are described as comprising text for exemplary purposes only, it should be clear that the portlets 235 may comprise any combination of text, graphics, video, audio, or any other form of communication.

Figure 3:
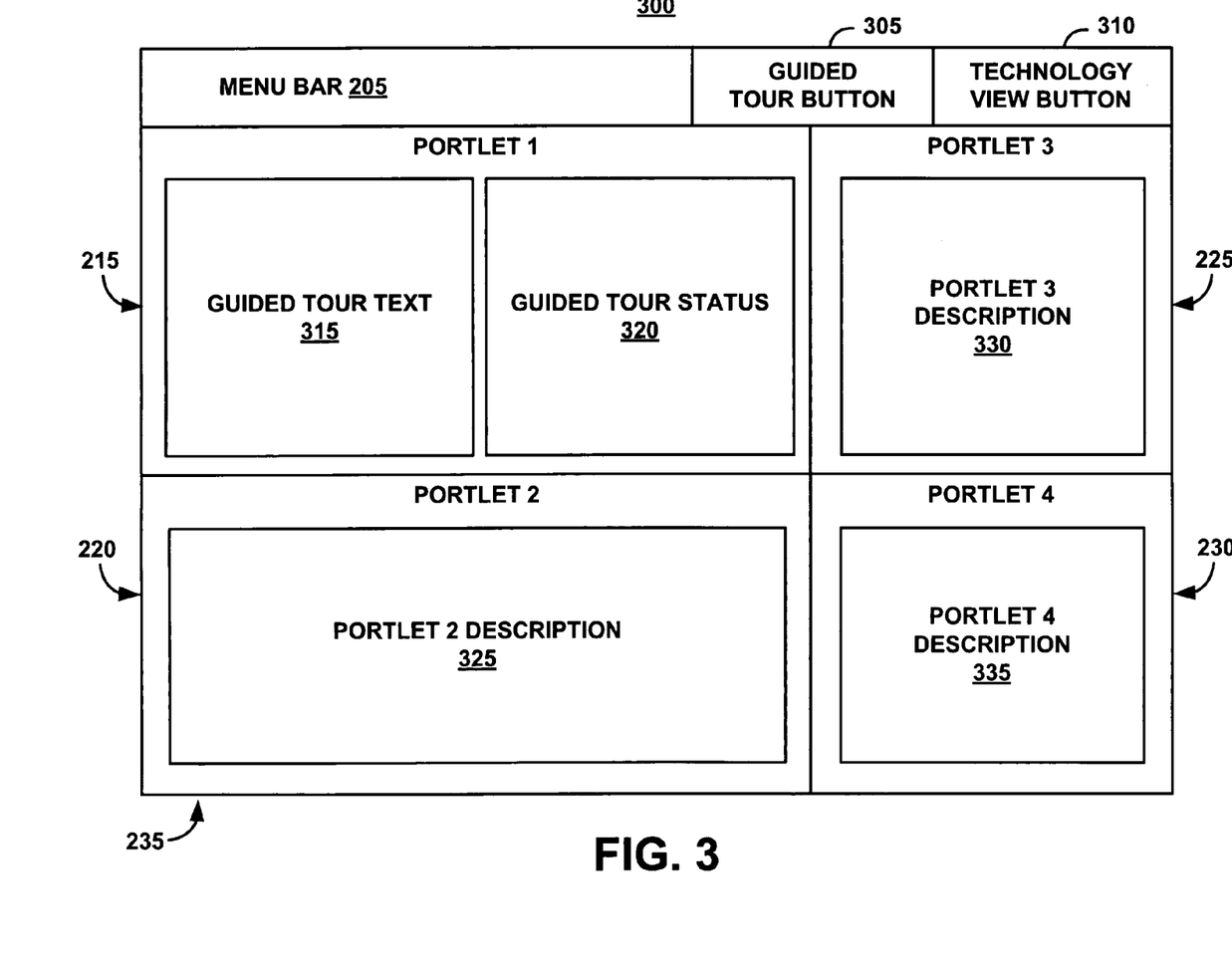
FIG. 3 is a block diagram of an exemplary operation guidance user interface of the state-based guidance system of FIG. 1.

A user selects the expansion button 210 to access the functionality of system 10. FIG. 3 illustrates a block diagram of an exemplary user interface 300 displayed after the expansion button 210 has been selected. The user interface 300 comprises the menu bar 205 and portlets 235. The menu bar 205 comprises a guided tour button 305 and a technology view button 310. Selecting the guided tour button 305 activates the operation guidance system 25. Selecting the technology view button 310 activates the technology guidance system 30. The operation guidance system 25 can be in an active state or an inactive state. To ensure that any uninitiated users are provided with guidance immediately, a default state of the operation guidance system 25 is active.

Portlet 1, 215, comprises a guided tour text 315 and a guided tour status 320. Each of the portlets 235 comprises a description. For example, portlet 2, 220, comprises a portlet 2 description 325. Portlet 3, 225, comprises a portlet 3 description 330. Portlet 4, 230, comprises a portlet 4 description 335.

The operation guidance system 25 provides step-by-step instructions in the guided tour status 320. A description of a current step is provided in the guided tour text 315. The operation guidance system 25 emphasizes the current step by emphasizing the step, such as by highlighting, using bold characters, changing a text color, changing a graphical element color, boxing, flashing, animating, italicizing, circling, and capitalizing. The operation guidance system 25 further displays previous steps (if any) and a next step (if any), allowing the user to have a general idea of the current location in a list of steps. In one embodiment, some or all the remaining steps are displayed. In another embodiment, none of the remaining steps are displayed. As each step is displayed, the operation guidance system 25 highlights an appropriate area of the screen where an action associated with the current step is required. For example, the operation guidance system 25 may highlight an active area in the portlets 235 where the user is required to click, enter information, etc. Information in the guided tour text 315 and the guided tour status 320 can be dynamically rendered, based on the state and context of the application. Moreover, emphasized text in the user portlets 235 may also be dynamically rendered based on the state of the operation guidance system 25 and context of the web-based application 15.

To use the operation guidance system 25, a user follows the step-by-step instructions in the guided tour status 320. The operation guidance system detects a state or current context of system 10 and provides an appropriate instruction in the guided tour status 320 based on the state or the current context. The operation guidance system 25 determines an initial state and subsequent states in the guided tour status 320 using one or more user attributes stored in system 10. The initial state of guided tour status 320 is set to a default value of "ON". Guidance provided by the operation guidance system 25 can be individualized to a specific user. Furthermore, additional users utilizing system 10 can see different views of user interface 300, based on the state of the guided tour status 320 as individualized to each of the additional users.

Figure 4:
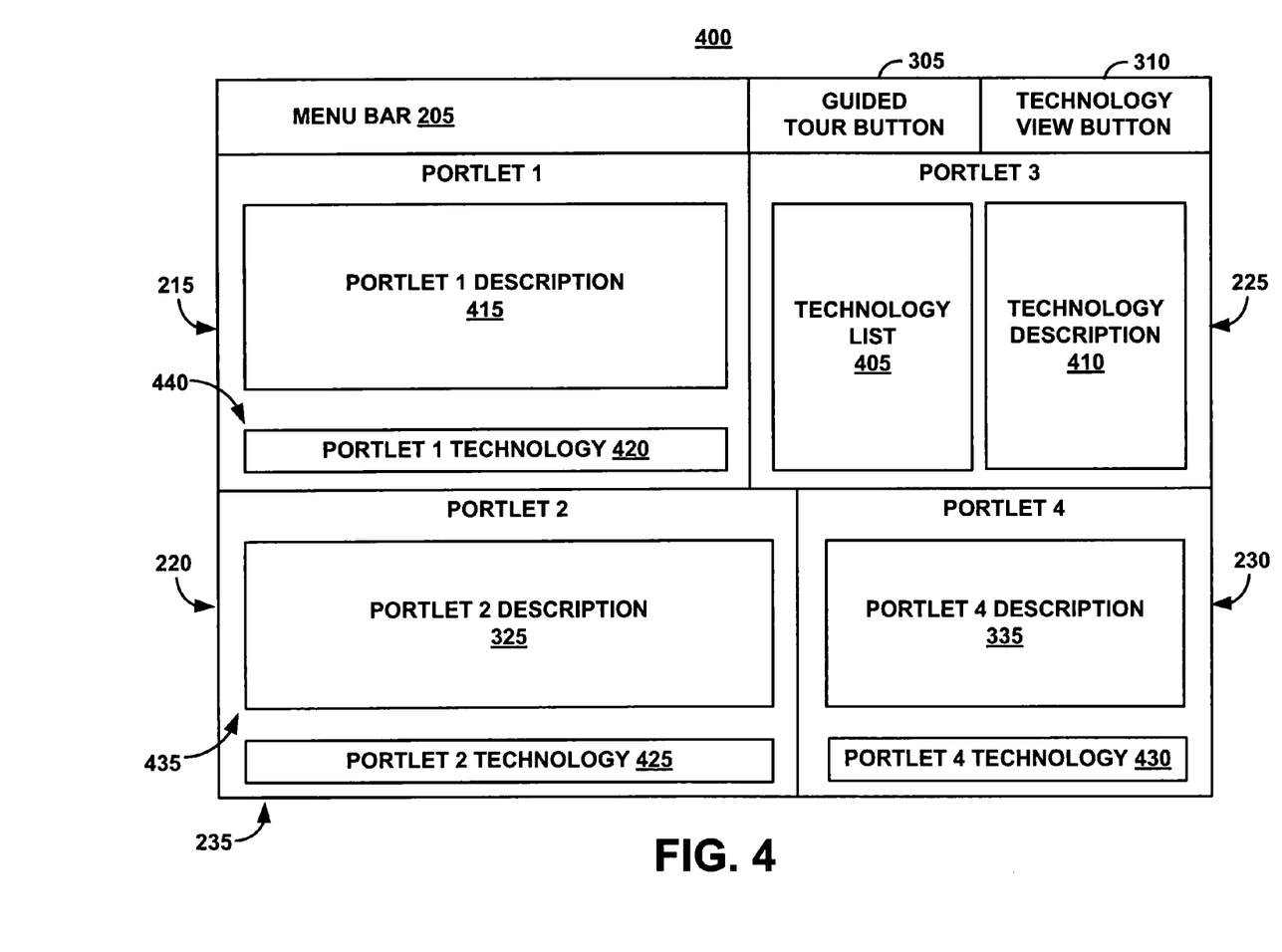
FIG. 4 is a block diagram of an exemplary technology guidance user interface of the state-based guidance system of FIG. 1.

FIG. 4 illustrates a block diagram of an exemplary user interface 400 displayed after the technology view button 310 has been selected. The user interface 400 comprises the menu bar 205, the guided tour button 305, the technology view button 310, and portlets 235. Portlet 3, 225, comprises a technology list 405 and a technology description 410. Portlet 1, 215, comprises a portlet 1 description 415 and a portlet 1 technology 420. Portlet 2, 220, comprises the portlet 2 description 325 and a portlet 2 technology 425. Portlet 4, 230 comprises the portlet 4 description 335 and a portlet 4 technology 430. The portlet 1 description 415, the portlet 2 description 325, and the portlet 4 description 335 are collectively referenced as portlet descriptions 435. The portlet 1 technology 420, the portlet 2 technology 425, and the portlet 4 technology 430 are collectively referenced as portlet technologies 440.

The technology list 405 comprises a list of the technologies used in the web-based application 15. A user can select any of the technologies in the list to view a description of the selected technology in the technology description 410. The technology guidance system 30 emphasizes the selection in the technology list 405. Emphasis may be provided by, for example, highlighting the selected technology, displaying the selected technology in bold, etc.

At least some of the portlets 235 comprise a portlet description, as indicated by the portlet descriptions 435. The portlet descriptions 435 comprise the content of the applications embodied in the portlets 235. The portlet technologies 440 display the selected technology in the technology list 405 if the selected technology is used by the corresponding portlet. As previously described for the operation guidance system 25, the technology guidance system 30 maintains a technology view state. The technology guidance system 30 further communicates the technology view state to all related parts of the user interface 400 that are rendered according to the technology view state. These related parts comprise highlighting of the selected technology in the technology list 405, display of a description of the technology in the technology description 410, and display of the selected technology in those portlets 235 in which the selected technology is used.

Figure 5:
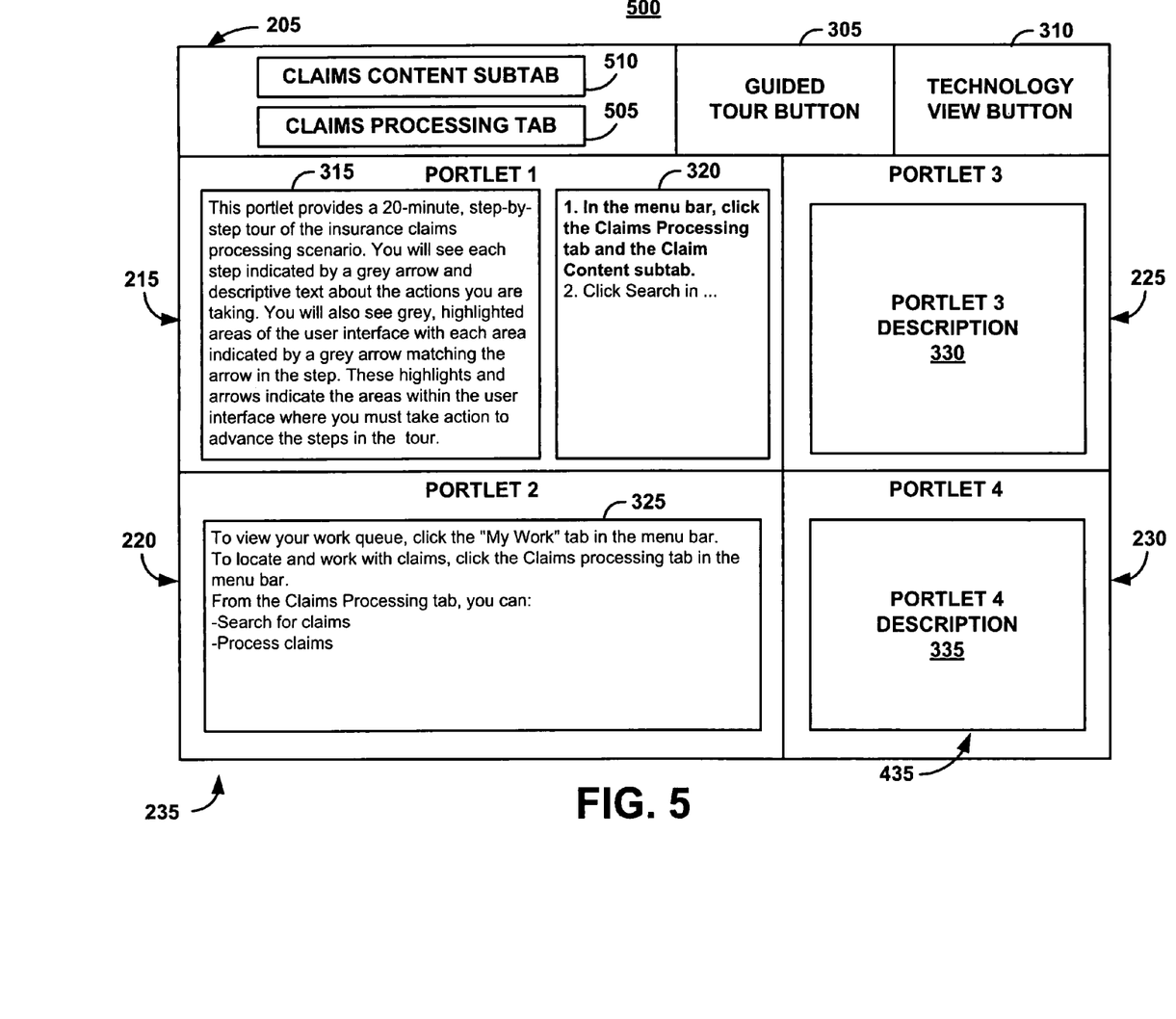
FIG. 5 is a block diagram of an exemplary operation guidance user interface of the state-based guidance system of FIG. 1 for an introduction to an insurance claims processing application.

FIG. 5 illustrates an exemplary user interface 500 for system 10 implemented for an insurance claims processing application, illustrating performance of the operation guidance system 25. A user has selected the expansion button 210 to display the user interface 500. Portlet 1, 215 displays instructions in the guided tour status 320 for navigating the step-by-step instructions of the operation guidance system 25. The guided tour text 315 comprises text describing the current step, indicated in the guided tour status 320 as bold, in this example. The portlet 2 description 325 comprises text. The menu bar 205 comprises a claims processing tab 505. Any application of the current step to any of the portlets 235 is displayed in the associated portlet descriptions 435.

An initial step in the guided tour status 320 instructs the user as follows: "In the menu bar, click the claims processing tab and the claim content subtab." An introductory description of the operations guidance system 25 is displayed in the guided tour text 315. Portlet description 2, 325, displays text describing how selecting the claims processing tab applies to the portlet 2, 220.

Figure 6:
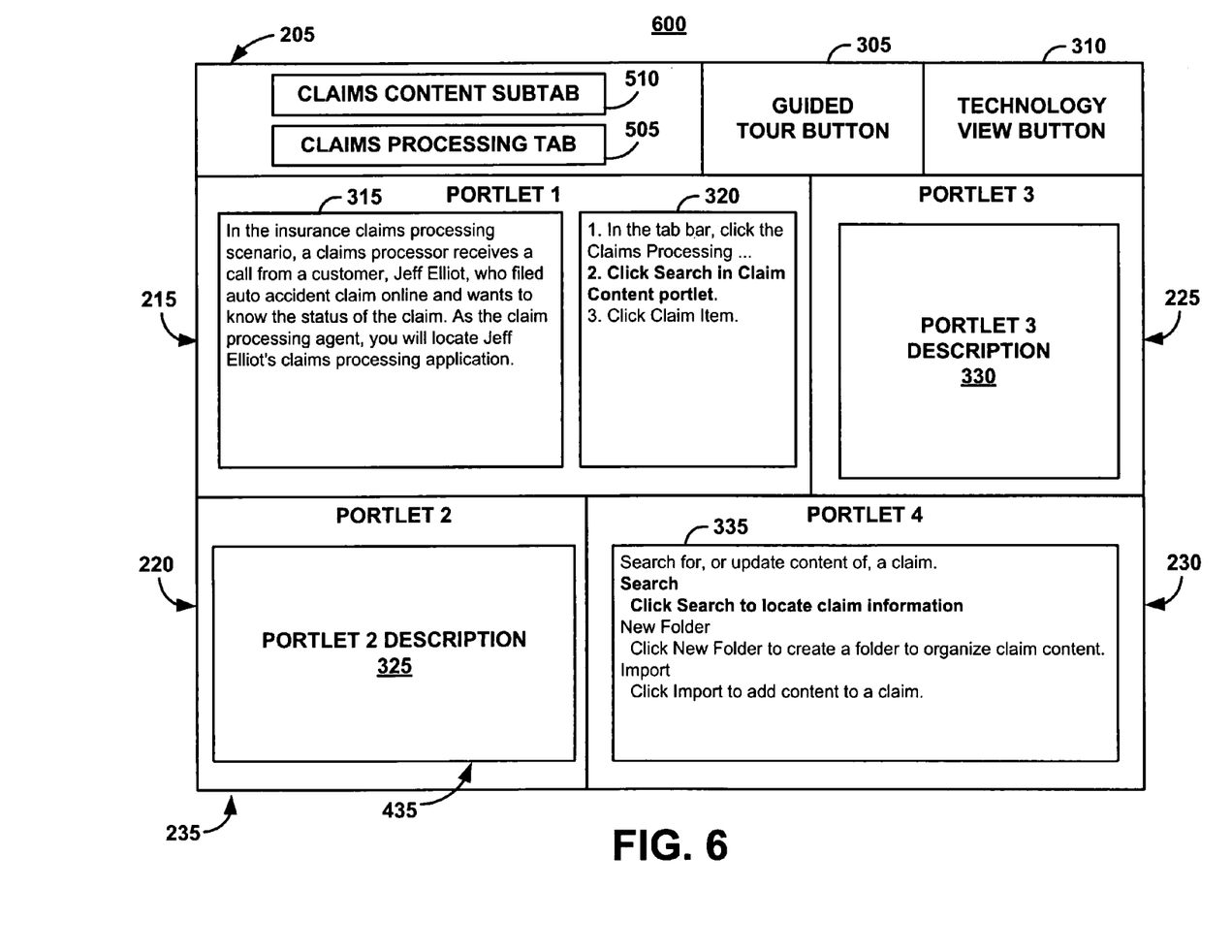
FIG. 6 is a block diagram of an exemplary operation guidance user interface of the state-based guidance system of FIG. 1 for an insurance claims processing application in a subsequent step.

The user clicks the claim processing tab 505 and claim content subtab 510, displaying an exemplary user interface 600 shown in FIG. 6. The operation guidance system 25 removed emphasis from step 1, and emphasized step 2 in the guided tour status 320. The operation guidance system 25 further displays text in the guided tour text 315 that corresponds to the current step in the guided tour status 320. The current step in the guided tour status 320 instructs the user as follows: "Click search in claim content portlet". In this example, portlet 4, 230, is the "claim content portlet". The portlet 4 description 335 comprises text that explains the search function and instructs the user in use of the search function. The word "search" is emphasized in bold in the portlet 4 description 335 to indicate how the current step applies to the portlet 4, 230.

Each action taken by the user in following the steps of the guided tour status 320 triggers a state update in the operation guidance system 25. The steps of the guided tour status 320 advance. As a new state is detected, guidance in the form of guided tour text 315 and guided tour status 320 are rendered according to the new state. The next action area in the application is highlighted.

Figure 7:
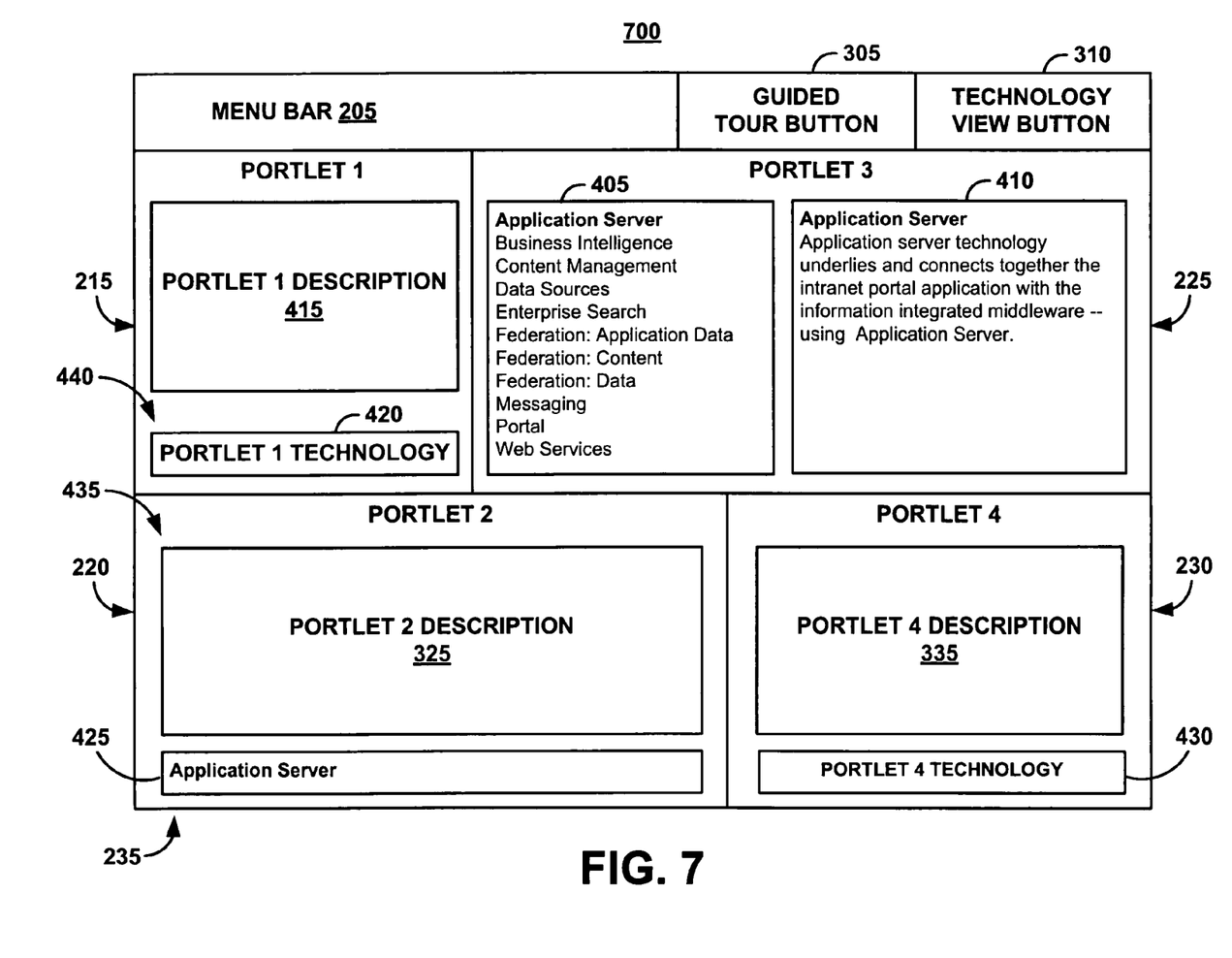
FIG. 7 is a block diagram of an exemplary technology guidance user interface of the state-based guidance system of FIG. 1 for an insurance claims processing application.

FIG. 7 illustrates an exemplary user interface 700 for system 10 implemented for an insurance claims processing application, illustrating performance of the technology guidance system 30. A user has selected the technology view button 310. The technology guidance system 30 displays a list of technologies used by the web-based application 15 in the technology list 405. In one embodiment, an initial item in the technology list 405 is selected automatically, such that the technology "application server" is emphasized in bold. As the technology "application server" is selected, the technology guidance system 30 displays a description of the technology "application server" in the technology description 410.

Portlet 2, 220, utilizes the technology "application server". Consequently, "application server" is displayed and emphasized in the portlet 2 220. In one embodiment, unselected technologies in the technology list 405 are displayed but not emphasized, as indicated by the portlet 4 technology 430.

If the state or context of the web-based application 15 changes, the technology guidance system 30 changes emphasis of displayed technologies accordingly. For example, a newly displayed portlet displays the selected technology in an emphasized manner.

Likewise, if a new technology is selected from the technology list 405, the portlet highlighting changes to reflect the selected technology. The technology description 410 further offers related links to additional information about the selected technology. This additional information is dynamically retrieved from a pool of information about the selected technology found, for example, on a Web site.

Figure 8:
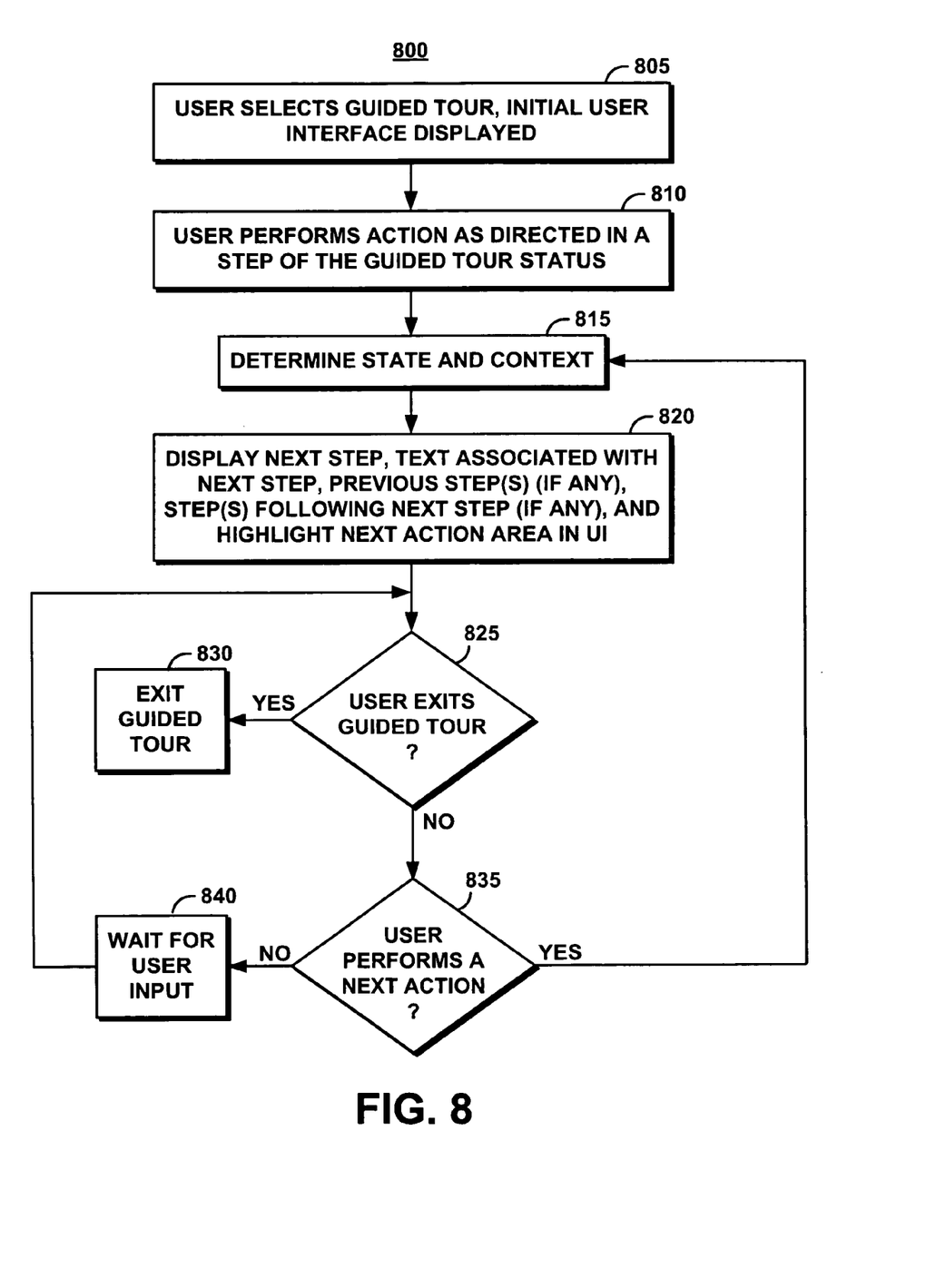
FIG. 8 is a process flow chart illustrating a method of operation of the operation guidance system of the context guidance system of FIG. 1.

FIG. 8 illustrates a method 800 of the operation guidance system 25 of system 10. A user selects a guided tour and the operation guidance system 25 displays an initial user interface (step 805). The user performs an action as directed in a step of the guided tour status 320 (step 810). The operation guidance system 25 determines the state and the context of system 10 and the web-based application 15 (step 815). Based on the determined state and context, the operation guidance system displays the next step in the guided tour status 320, text associated with the next step, one or more previous steps (if any), and one or more steps following the next step (if any) (step 820). The next action area in the application is highlighted.

The user may exit the guided tour provided by the operation guidance system 25 at any time. The operation guidance system 25 determines whether the user has selected an exit button or performed an exit function to exit the guided tour (decision step 825). If yes, the operation guidance system 25 exits the guided tour (step 830). If no, the operation guidance system 25 determines whether the user performs a next action (decision step 835). If yes, the operation guidance system returns to step 815 and repeats steps 815 through 825. Otherwise, the operation guidance system 25 waits for additional input from the user (step 840) and returns to decision step 825.

Figure 9:
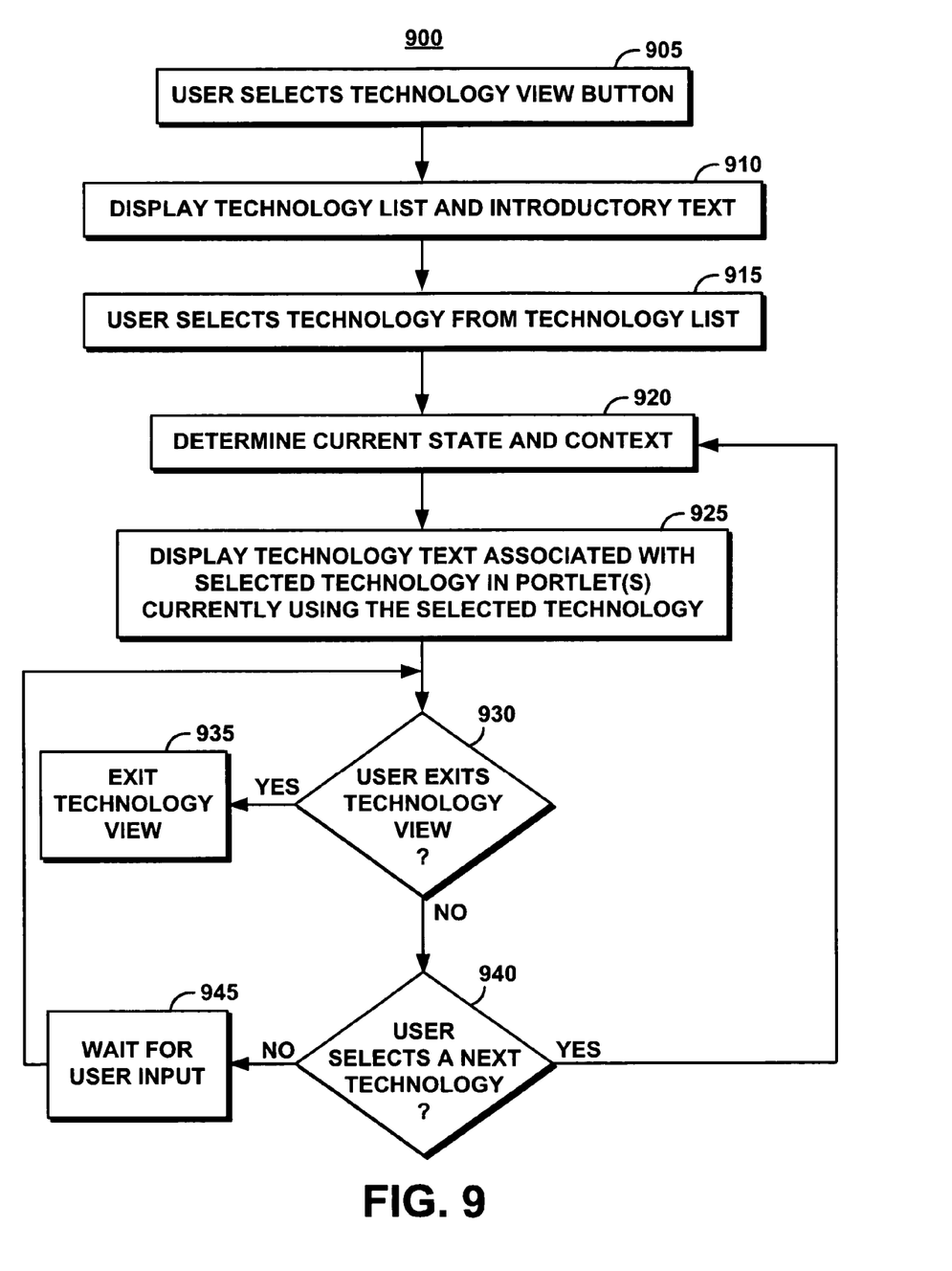
FIG. 9 is a process flow chart illustrating a method of operation of the technology guidance system of the context guidance system of FIG. 1.

FIG. 9 illustrates a method 900 of the technology guidance system 30 of system 10. The user selects the technology view button 310 (step 910). The technology guidance system 30 displays a technology list in the technology list 405 and a technology description in the technology description 410 for an initially selected technology (step 910). The user selects a technology from the technology list 405. The technology guidance system 30 determines a current state and context for system 10 and the web-based application 15 (step 920). The technology guidance system 30 displays technology text associated with the selected technology in the portlets 235 currently using the selected technology (step 925).

The user may exit the user interface provided by the technology guidance system 30 at any time. The technology guidance system 30 determines whether the user has selected an exit button or performed an exit function to exit the technology view of the technology guidance system 30 (decision step 930). If yes, the technology guidance system 30 exits the technology view (step 935). If no, the technology guidance system 30 determines whether the user selects a next technology (decision step 940). If yes, the operation guidance system returns to step 920 and repeats steps 920 through 930. Otherwise, the technology guidance system 30 waits for additional input from the user (step 945) and returns to decision step 930.

It is to be understood that the specific embodiments of the invention that have been described are merely illustrative of certain applications of the principle of the present invention. Numerous modifications may be made to the system and method for providing state-based guidance and technology view for an application described herein without departing from the spirit and scope of the present invention. Moreover, while the present invention is described for illustration purpose only in relation to the WWW, it should be clear that the invention is applicable as well to, for example, a local area network, an intranet, a locally installed application with no network access or dependency, etc.

What is claimed is:

1. A computer-implemented method of providing a plurality of users with a guided tour of an application comprising a plurality of portlets, the computer-implemented method comprising:
    determining an initial state of the application based upon at least one user attribute to display a set of steps within one of the plurality of portlets and to emphasize a current action area in at least one of the plurality of portlets of the application; and
    determining an updated state of the application based upon the at least one user attribute and a user action corresponding to one of the set of steps to display a new set of steps and descriptive text associated with each of the new set of steps within the one of the plurality of portlets, and to emphasize a new current action area in at least one of the plurality of portlets of the application, wherein each user action triggers determining an updated state of the application, wherein the guided tour is individualized to each of the plurality of users based upon each updated state of the application.

2. The method of claim 1, wherein emphasizing comprises any one or more of: highlighting, using bold characters, changing a text color, changing a graphical element color, boxing, flashing, animating, italicizing, circling, and capitalizing.

3. The method of claim 1, further comprising providing a state-based technology view for an application.

4. The method of claim 3, wherein providing the state-based technology view for the application comprises selecting a state-based technology view.

5. The method of claim 4, wherein providing the state-based technology view for the application further comprises displaying a set of technologies in a technology list.

6. The method of claim 5, wherein providing the state-based technology view for the application further comprises selecting a desired technology from the set of technologies.

7. The method of claim 6, wherein providing the state-based technology view for the application further comprises emphasizing the selected technology in the set of technologies.

8. The method of claim 7, wherein providing the state-based technology view for the application further comprises displaying a descriptive text associated with the selected technology.

9. The method of claim 8, wherein providing the state-based technology view for the application further comprises providing access to descriptive information about the selected technology.

10. The method of claim 9, wherein providing the state-based technology view for the application further comprises emphasizing a visible aspect of the application utilizing the selected technology.

11. The method of claim 10, wherein providing the state-based technology view for the application further comprises, if a state of the application changes, selecting a newly visible aspect of the application utilizing the selected technology, in order to visualize at least one underlying technology used in the application.

12. A computer program product having program codes stored on a non-transitory computer readable medium, for providing a plurality of users with a guided tour of an application comprising a plurality of portlets, the computer program product comprising:
    a program code for determining an initial state of the application based upon at least one user attribute to display a set of steps within one of the plurality of portlets and to emphasize a current action area in at least one of the plurality of portlets of the application; and
    a program code for determining an updated state of the application based upon the at least one user attribute and a user action corresponding to one of the set of steps to display a new set of steps and descriptive text associated with each of the new set of steps within the one of the plurality of portlets, and to emphasize a new current action area in at least one of the plurality of portlets of the application, wherein each user action triggers determining an updated state of the application, wherein the guided tour is individualized to each of the plurality of users based upon each updated state of the application.

13. The computer program product of claim 12, further comprising providing a state-based technology view for an application.

14. The computer program product of claim 13, wherein providing the state-based technology view for the application comprises selecting a state-based technology view.

15. The computer program product of claim 14, wherein providing the state-based technology view for the application further comprises displaying a set of technologies in a technology list.

16. A system for providing a plurality of users with a guided tour of an application comprising a plurality of portlets, the system comprising:
   a processor;
   a data storage component;
   a display;
   an operation guidance module for determining an initial state of the application based upon at least one user attribute to display a set of steps within one of the plurality of portlets and to emphasize a current action area in at least one of the plurality of portlets of the application; and
   the operation guidance module for determining an updated state of the application based upon the at least one user attribute and a user action corresponding to one of the set of steps to display a new set of steps and descriptive text associated with each of the new set of steps within the one of the plurality of portlets, and to emphasize a new current action area in at least one of the plurality of portlets of the application, wherein each user action triggers determining an updated state of the application, wherein the guided tour is individualized to each of the plurality of users based upon each updated state of the application.

* * * * *